US006850095B2

(12) United States Patent
Sayers et al.

(10) Patent No.: US 6,850,095 B2
(45) Date of Patent: Feb. 1, 2005

(54) PROJECTOR OPTIC ASSEMBLY

(75) Inventors: Edwin Mitchell Sayers, Saline, MI (US); Jeyachandrabose Chinniah, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/424,044

(22) Filed: Apr. 25, 2003

(65) Prior Publication Data

US 2004/0213001 A1 Oct. 28, 2004

(51) Int. Cl.[7] ................................................ G02B 17/00

(52) U.S. Cl. ....................... 326/551; 362/555; 362/800; 362/347; 359/726; 359/727

(58) Field of Search ................................ 362/551, 555, 362/558, 800, 326, 327, 347, 305, 304; 385/133, 901; 359/726, 727, 708, 712, 641, 718, 719

(56) References Cited

U.S. PATENT DOCUMENTS

| | | | | |
|---|---|---|---|---|
| 1,928,539 A | | 9/1933 | Labastrou | |
| 3,088,023 A | | 4/1963 | Ayroldl | |
| 3,439,157 A | | 4/1969 | Myers | |
| 3,825,741 A | * | 7/1974 | Morton et al. | 362/218 |
| 4,389,698 A | | 6/1983 | Cibie | |
| 5,335,158 A | * | 8/1994 | Kaplan et al. | 362/303 |
| 5,343,330 A | * | 8/1994 | Hoffman et al. | 359/708 |
| 5,406,462 A | | 4/1995 | Fallahi et al. | |
| 5,757,557 A | * | 5/1998 | Medvedev et al. | 359/708 |
| 5,946,441 A | * | 8/1999 | Esch | 385/139 |
| 5,967,653 A | * | 10/1999 | Miller et al. | 362/580 |
| 6,050,705 A | | 4/2000 | Kusserow et al. | |
| 6,272,269 B1 | * | 8/2001 | Naum | 385/43 |
| 6,547,423 B2 | * | 4/2003 | Marshall et al. | 362/333 |
| 6,560,038 B1 | * | 5/2003 | Parkyn et al. | 359/726 |

* cited by examiner

*Primary Examiner*—Thomas M. Sember
*Assistant Examiner*—Hargobind S. Sawhney
(74) *Attorney, Agent, or Firm*—Brinks Hofer Gilson & Lione

(57) ABSTRACT

A projector optic assembly is disclosed for use with various light emitting sources to collect direct the rays of light into a high gradient beam pattern. The projector optic assembly includes a light pipe and a projector lens. The light pipe is segregated into several regions including a reflecting region, a funneling region and a transition plane separating the two regions. At the first end of the reflecting region, closest to the light emitting source, is a connecting lens. At the second end of the funneling region is an emitting aperture that is designed to refract light into the high gradient beam pattern.

23 Claims, 3 Drawing Sheets

PROJECTOR OPTIC ASSEMBLY

TECHNICAL FIELD

This invention relates generally to an efficient light collection assembly for use with a light emitting source and, more specifically to a projector optic assembly that defines and projects a high gradient beam pattern. The assembly according to the present invention will find utility in vehicle lighting systems, as well as in a variety of non-automotive illumination applications.

BACKGROUND

It is known to use light emitting sources, including light emitting diodes (LEDs), Lambertian emitters, 2π emitters, and fiber optic light guide tips, in a variety of applications, including, but not limited to, vehicular applications. With regard to LED sources, these sources are increasingly finding use in automotive, commercial, and general lighting applications since their light outputs have increased exponentially and their costs have fallen significantly over the past few years. LEDs are attractive due to their small size and the fact that they consume less power relative to incandescent light sources. The popularity of LEDs as light sources is expected to continue and increase as their potential benefits are further developed, particularly with respect to increased light output.

Today's LEDs come in different sizes and different emitting cone angles, ranging from 15 degrees (forward emitting or side emitting) to 180 degrees (hemispherical emitting). An emitting cone angle is typically referred to as 2ϕ . It is therefore very important to construct efficient light collection assemblies to harness the maximum possible light output from LEDs and to direct it in a predetermined controlled manner.

For particular applications, one such being a low beam headlight, it is important to project a high gradient beam pattern, such as an automotive low beam hot spot or cutoff, but not limited to these. High gradient beam patterns have a defined beam pattern outline with varying degrees of light intensity within the beam pattern outline.

Thus, there is a need in the lighting systems field to provide an improved light collection device that can be used with any type of LED to direct the light dispersion in a high gradient beam pattern. This invention provides such an improved LED light collection device.

SUMMARY

The present invention addresses these requirements by providing a projector optic assembly that defines and projects a high gradient beam pattern from a light emitting source, such as a LED. The projector optic assembly includes a light pipe and a projector lens, both of which are positioned along the optical axis defined by the light emitting source. The light pipe includes a reflecting region, a funneling region, and a transition plane or coupling region separating these two regions. Positioned at the first end of the reflecting region is a coupling region. The LED may have its own collecting optics, such as a reflector or lens, in which case, there may be simply a planar or concave hemispherical coupling region without any reflecting region. Positioned at the second end of the funneling region is an emitting aperture. The projector lens is spaced apart from the emitting aperture.

Constructed according to the teachings of the present invention, the projector optic assembly redirects light into a high gradient beam pattern regardless of the type of light emitting source being used.

These and other aspects and advantages of the present invention will become apparent upon reading the following detailed description of the invention in combination with the accompanying drawings.

DETAILED DESCRIPTION

Figure 1:
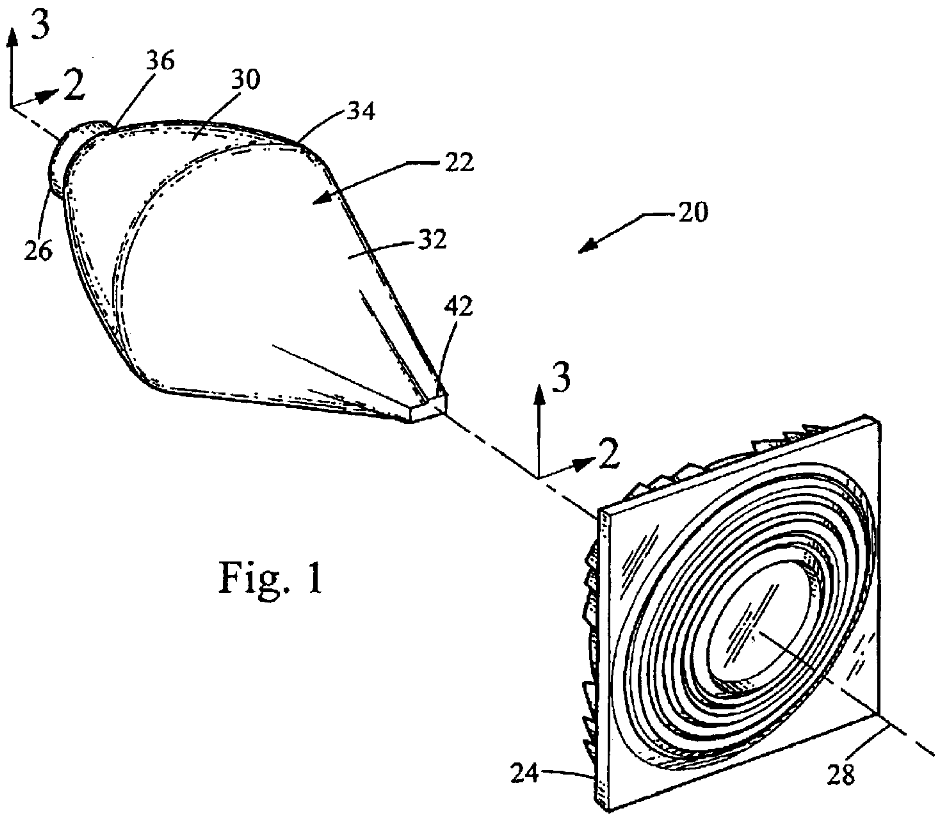
FIG. 1 is a perspective view of a projector optic assembly according to one embodiment of the present invention.

Referring to the drawings, a projector optic assembly according to one embodiment of the present invention is shown in FIG. 1 and generally designated at 20. The projector optic assembly 20 includes as its primary components a light pipe 22 and a projector lens 24.

The projector optic assembly 20 is used with a light emitting source 26. Although represented as LEDs in all the figures, the projector optic assembly 20 can be used with a variety of different classes of light emitting sources 26, including, but not limited to, LEDs, Lambertian emitters, 2π emitters, and fiber optic light guide tips. The projector optic assembly 20 can also be used with different types of light emitting sources within a particular class. The projector optic assembly 20 collects, reflects and refracts the light rays from the source 26 such that they exit the projector optic assembly 20 in a high gradient beam pattern.

Figure 2A:
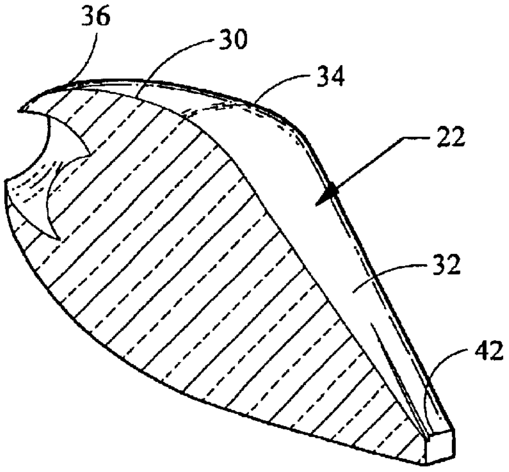
FIGS. 2*a* and 2*b* are perspective views, with portions cut away, of alternate embodiments of the image shaping light pipe portion of the projector optic assembly seen in FIG. 1.
Figure 2B:
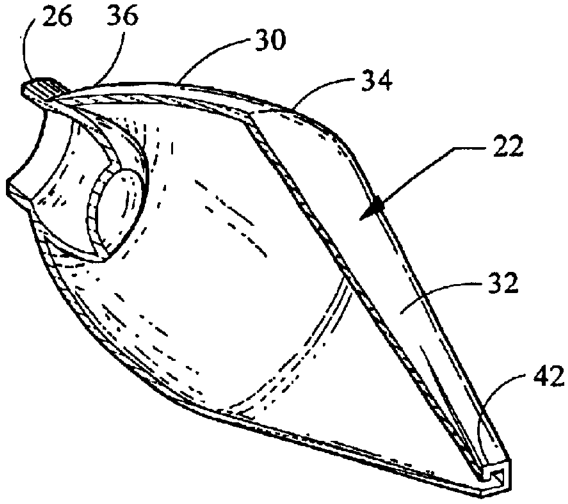

As shown in FIGS. 2*a* and 2*b*, the light pipe 22 is constructed as a solid body and is provided with a coupling region 46, a reflecting region 30, a funneling region 32, and a transition plane 34 therebetween. Preferably, the light pipe 22 is designed to reflect all rays of light traveling through it via total internal reflection. Therefore, the index of refraction of the material should be as high as possible, but is likely to be in the range of 1.4–1.8, given the materials available, such as glass, plastics, etc. The light pipe 22 may be composed of one solid material, for example glass or plastic, or may be constructed with a solid outer material, such as glass or plastic, and a fluid or gel material filled interior. There may also be coatings applied to the light pipe 22 in order to enhance the reflective or transmissive properties of the various regions it contains. Further, the overall length of the light pipe is preferably in the range of 30–70 millimeters.

The reflecting region 30 is generally of a conical shape having a first end 36, located toward the source 26, and a second end located at the transition plane 34. The reflecting region 30, while preferred as a conical shape, could be alternatively of a paraboloid shape or ellipsoid shape. In all instances the first end 38 has a first effective cross-sectional diameter which is less than a second cross-sectional diameter of the second end. The reflecting region 30 may further serve to direct the reflected light in such a way as to create a certain intensity distribution within the subsequent regions of the light pipe, this may result in faceting or segmenting of the collection region, either in radial segments, rings, rectangular patches, but not limited to these shapes.

In an alternative embodiment, the LED may have its own collecting optics, such as a reflector or lens. In that situation, the reflecting region may be omitted in favor of a planar or outwardly convex, reflective, coupling region, or transition plane or couping region. Such embodiments are seen in FIGS. 3*b* and 3*c* with the LED omitted.

Referring back to FIGS. 1 and 2*a*, the funneling region 32 is generally conical in shape and has a first end, at the transition plane 34 and a second end 42. The funneling region's first end has a round cross-section of a first diameter, while the second end 42 has a generally rectangular cross-section of 4 mm by 4 mm.

A transition plane 34 is defined as the area between the reflecting region 30 and the funneling region 32 by the second end of the reflecting region 30 and the first end of the funneling region 32. Preferably, the transition plane 34 has approximately a 15–40 millimeter diameter. Therefore, the reflecting region's second cross-sectional diameter and the funneling region's first cross-sectional diameter are the same and the transition plane 34 is the widest portion of the light pipe 22.

Figure 3A:
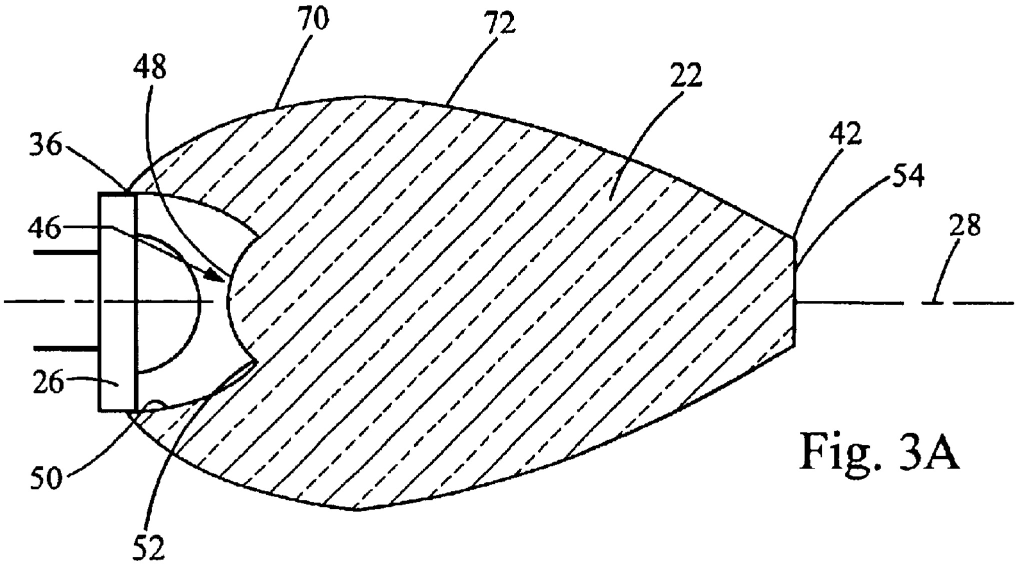
FIGS. 3*a*, 3*b* and 3*c* are longitudinal sectional views of alternate embodiments of the image shaping light pipe seen in FIG. 2.
Figure 3B:
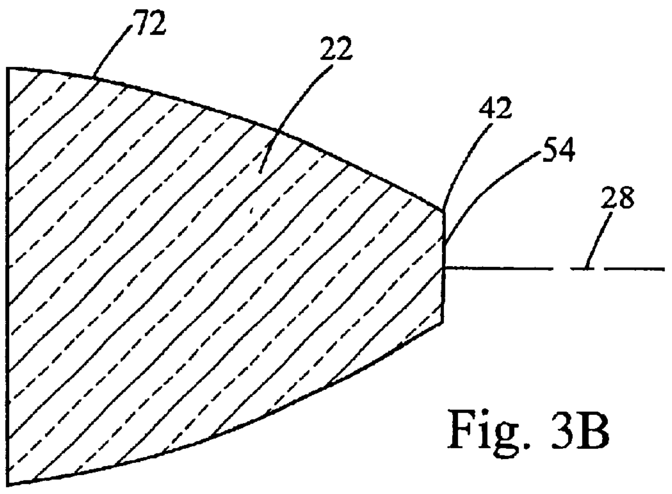
Figure 3C:
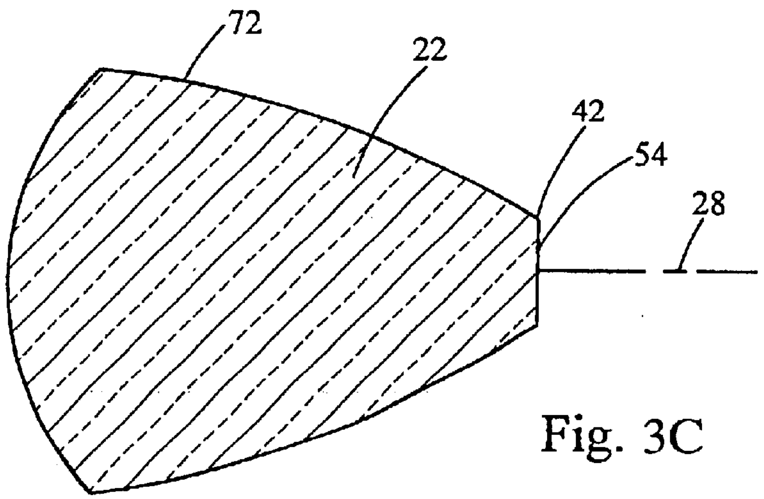

As detailed in both FIGS. 2*a* and 3*a*, a coupling region 46 is formed in the first end 36 of the reflecting region 30. More specifically, the coupling region 46 is a recessed portion in the first end 36 of the reflecting region 30 that surrounds the light emitting source 26 so that it captures a maximum amount of light being emitted from the light emitting source 26. Helping in this regard, the entire surface of the coupling region 46 is a refractive surface.

The coupling region 46 includes two sections: a central concentrating section 48, which is radially centered on the optical axis defined by the light emitting source 26, and an outer section 50, which is radially spaced from the optical axis 28 and which circumferentially surrounds the central concentrating section 48. Preferably, the central concentrating section 48 is generally hyperbolic or hemispherical in shape and outwardly convex. The outer section 50 defines an inwardly concave hemispherical wall that extends radially outward from an outer circumference 52 of the central concentrating section 48.

Further, an emitting aperture 54 is defined in the second end 42 of the funneling region 32. In general, a goal in designing the emitting aperture 54 is to have as small a surface area as possible for the aperture 54. The smaller the surface area of the aperture 54, the more intense the light will be in the projected beam pattern. However, a decreased size of this aperture will normally come at the cost of a wider spread of light from the aperture, causing more light to miss the lens 24; therefore there is a practical limit to the size of the aperture 54.

Figure 4:
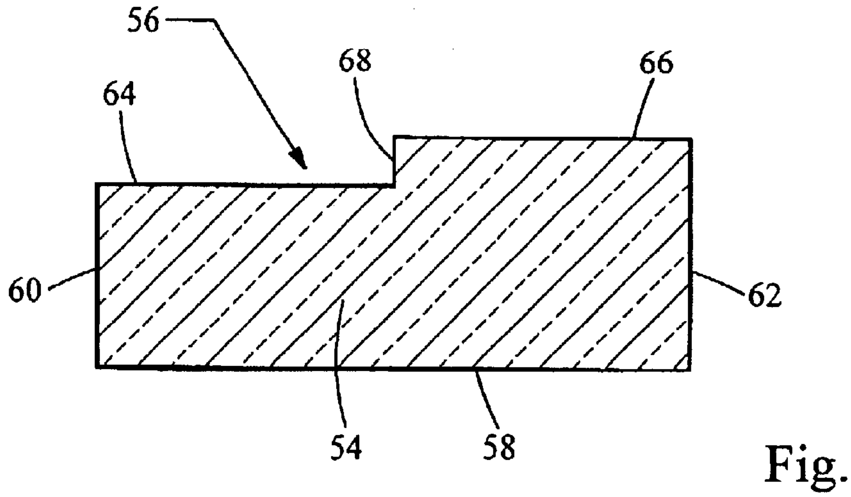
FIG. 4 is an end view of just the emitting aperture of the image shaping light pipe.

The shape of the emitting aperture 54 will vary depending on the desired beam pattern. However, for low beam headlights the shape is preferably a rectangular shape having a modified upper edge. One such shape is illustrated in FIG. 4. The outer perimeter of the emitting aperture 54 includes four edges: an upper edge 56; a lower edge 58; a left edge 60; and a right edge 62 (directional references to be used solely as a clarity aid with reference to the orientation of FIG. 4). In this particular embodiment, the upper edge 56 is stepped and includes first and second parallel surfaces 64 and 66, and an angled surface 68 extending between the first and second surfaces 64, 66. It is important to note that surface 68 could be angled at other than 90° relative to surfaces 64 and 66 and that other potential cross sectional shapes for the emitting aperture 54, such as circles, ovals, and squares, could be used, depending on what type beam is to be formed. Further the aperture 54 may be planar or may have a curved surface in order to further shape the intensity distribution to be projected from it.

The projector lens 24 receives the rays of light exiting from the emitting aperture 54 in the desired beam pattern and projects the rays without altering the outline or gradient of the beam pattern. The projector lens 24 could be any type of lens, including but not limited to, a Fresnel lens as shown in FIG. 1, or any type of aspheric lens. In a preferred embodiment, a cross-sectional area of the projector lens is one square inch (1 $in^2$) and is spaced approximately 30 millimeters from the emitting aperture 54. There may also be some spreading optics integrated into the projector lens, so as to produce a small amount of spread in the projected beam pattern, usually a horizontal spread. These spreading optics may take the form of flutes, pillows or some similar surface structure, such as a holographic structure.

As the rays of light are emitted from the light emitting source 26, they are collected and refracted by the coupling region 46. The coupling region 46 is designed to refract the rays by generally directing them toward the emitting aperture 54. A majority of the rays are refracted directly toward the emitting aperture 54. The other rays are reflected off of the outer walls 70, 72 of either the reflecting region 30, the funneling region 32 or both and are directed toward the emitting aperture 54. The emitting aperture 54 is designed so that all of the, rays that travel through it are refracted into the desired high gradient beam pattern. The high gradient beam pattern travels through the projector lens 24 and is projected over a broader area while retaining its high gradient beam pattern.

Preferably, numerous projector optic assemblies will be used in combination to achieve a desired intensity level and illumination area for a particular application. For example, twenty such assemblies 20 may be collectively used to define all or a portion of an automotive headlamp assembly.

As any person skilled in the art of optics will recognize from the previous detailed description and from the figures and claims, modifications and changes can be made to the preferred embodiments of the invention without departing from the scope of this invention defined in the following claims.

We claim:

1. A projector optic assembly for defining and projecting a high gradient beam pattern, the projector optic assembly comprising;

- a light emitting source, said light emitting source defining an optical axis;
- a light pipe positioned along the optical axis and including a reflecting region, a transition plane, a funneling region, and emitting aperture:
  - said reflecting region having a first end and a second end with said first end having a smaller effective diameter than said second end diameter, wherein at least a portion of said first end defines a coupling region;
  - said funneling region having a first end and a second end with said first end having an effective diameter greater than said second end, wherein at least a portion of said second end defines said emitting aperture: and
  - said transition plane being defined by said second end of said reflecting region and said first end of said funneling region; and
- a projector lens positioned along the optical axis, said projector lens being spaced apart from the outer wall of said light pipe and located generally opposite of said emitting aperture.

2. The projector optic assembly of claim 1 wherein said reflecting region has a generally conical exterior shape.

3. The projector optic assembly of claim 1 wherein said coupling region includes a central section radially centered on said optical axis and an cuter section radially spaced from said optical axle and surrounding said central section.

4. The projector optic assembly of claim 3 wherein said central section is generally hemispherical in shape having a surface concaved toward said light source.

5. The projector optic assembly of claim 4 wherein said outer section defines a wall extending generally outward from an outer circumference of said central section, said wall being a surface concaved toward said optical axis.

6. The projector optic assembly of claim 1 wherein said reflecting region is generally a paraboloid shape.

7. The projector optic assembly of claim 1 wherein said reflecting region is generally an ellipsoidal shape.

8. The projector optic assembly of claim 1 wherein said funneling region is generally conical in shape.

9. The projector optic assembly of claim 1 wherein said projector lens is a Fresnel lens.

10. The projector optic assembly of claim 1 wherein said projector lens has a cross sectional area appropriately one square inch.

11. The projector optic assembly of claim 1 wherein said light pipe is coupled to said light emitting source.

12. The projector optic assembly of claim 1 wherein said light emitting source is a light emitting diode.

13. The projector optic assembly of claim 1 wherein said light pipe is solid.

14. The projector optic assembly of claim 13 wherein said light pipe is made from a material having an index of reaction in a range of 1.4 to 1.8.

15. The projector optic assembly of claim 1 wherein said light transition plane has a diameter measuring approximately 20 to 30 millimeters.

16. The projector optic assembly of claim 1 wherein said light pipe has a length measuring in the range of 50 to 70 millimeters.

17. The projector optic assembly of claim 1 wherein said projector lens is axially spaced approximately 25 to 35 millimeters from said emitting.

18. A projector optic assembly for defining and projecting a high gradient beam pattern, the projector optic assembly comprising:

a light emitting source, said light emitting source defining an optical axis;

a light pipe positioned along the optical axis and including a reflecting region, a transition plane a funneling region, and emitting aperture:

said reflecting region having a first end and a second end, wherein at least a portion of said first end defines a coupling region, said coupling region including a central section radially centered on said optical axis and an outer section radially spaced from said optical axis and surrounding said central section, said outer section defining a wall extending generally outward from an outer circumference of said central section and said wall being a surface concaved toward, said optical axis;

said funneling region having a first end and a second end, wherein at least a portion of said second end defines said emitting aperture; and said transition plane being defined by said second end of said reflecting region and said first end of said funneling region; and a projector lens positioned along the optical axis, said projector lens being spaced apart from said light pipe and located generally opposite of said emitting aperture.

19. A projector optic assembly for defining and projecting a high gradient beam pattern, the projector optic assembly comprising:

a light emitting source, said light emitting source defining an optical axis;

a light pipe positioned along the optical axis and including a reflecting region, a transition plane, a funneling region and emitting aperture:

said reflecting region having a first end and a second end; wherein at least a portion of said first end defines a coupling region;

said funneling region having a first end and a second end, wherein at least a portion of said second end defines said emitting aperture; and said transition plane being defined by said second end of said reflecting region and said first end of said funneling region and further defining a diameter being the largest diameter in said light pipe; and a projector lens positioned along the optical axis, said projector lens being spaced apart from said light pipe and located generally opposite of said emitting aperture.

20. A projector optic assembly for defining and projecting a high gradient beam pattern, the projector optic assembly comprising:

a light emitting source, said light emitting source defining an optical axis;

a light pipe positioned along the optical axis and including a reflecting region, a transition plane, a funneling region, and emitting aperture:

said reflecting region having a first end and a second end, wherein at least a portion of said first end defines a coupling region;

said funneling region having a first end and a second end, wherein at least a portion of said second end defines said emitting aperture, said emitting aperture being generally rectangular in shape; and said transition plane being defined by said second end of said reflecting region and said first end of said funneling region; and a projector lens positioned along the optical axis, said projector lens being shaped apart from said light pipe and located generally opposite of said emitting aperture.

21. The projector optic assembly of claim 20 wherein sold emitting aperture includes an upper edge, a lower edge, a left edge, and a right edge.

22. The projector optic assembly of claim 21 wherein said emitting aperture upper edge is stepped.

23. The projector optic assembly of claim 22 wherein said upper edge includes first and second parallel surfaces, and an angled surface extending between said first and second parallel surfaces aperture.

* * * * *

UNITED STATES PATENT AND TRADEMARK OFFICE

CERTIFICATE OF CORRECTION

PATENT NO. : 6,850,095 B2 
DATED : February 1, 2005
INVENTOR(S) : Edwin Mitchell Sayers et al.

It is certified that error appears in the above-identified patent and that said Letters Patent is hereby corrected as shown below:

Column 4,
Line 48, immediately after “comprising” delete “;” (semicolon) and substitute -- : -- (colon) in its place.

Column 5,
Line 11, before “toward” delete “concaved” and substitute -- convexed -- in its place.
Line 35, delete “reaction” and substitute -- refraction -- in its place.
Line 37, before “transition” delete “light”.
Line 44, delete “emitting.” and substitute -- emitting aperture. -- in its place.
Line 51, immediately after “plane” insert -- , -- (comma).

Column 6,
Line 17, immediately after “end” delete “;” (semicolon) and substitute -- , -- (comma) in its place.
Line 63, delete “surfaces aperture.” and substitute -- surfaces. -- in its place.

Signed and Sealed this

Thirteenth Day of September, 2005

JON W. DUDAS
*Director of the United States Patent and Trademark Office*

UNITED STATES PATENT AND TRADEMARK OFFICE

CERTIFICATE OF CORRECTION

PATENT NO. : 6,850,095 B2 | Page 1 of 1
APPLICATION NO. : 10/424044
DATED : February 1, 2005
INVENTOR(S) : Edwin Mitchell Sayers et al.

It is certified that error appears in the above-identified patent and that said Letters Patent is hereby corrected as shown below:

<u>Column 4</u>
Line 46, immediately after "comprising" delete "," (semicolon) and substitute --;-- (colon) in its place.

<u>Column 6</u>
Line 60, delete "surfaces aperture." and substitute --surfaces.-- in its place.

Signed and Sealed this

Twenty-fifth Day of July, 2006

JON W. DUDAS
*Director of the United States Patent and Trademark Office*